US006953868B2

(12) United States Patent
Boaen et al.

(10) Patent No.: US 6,953,868 B2
(45) Date of Patent: Oct. 11, 2005

(54) OXYFUNCTIONALIZATION OF POLYOLEFINS

(75) Inventors: Nicole K. Boaen, Minneapolis, MN (US); Marc A. Hillmyer, Minneapolis, MN (US); Stephen F. Hahn, Midland, MI (US)

(73) Assignees: Dow Global Technologies Inc., Midland, MI (US); Regents of the University of Minnesota, Minneapolis, MN (US)

(*) Notice: Subject to any disclaimer, the term of this patent is extended or adjusted under 35 U.S.C. 154(b) by 0 days.

(21) Appl. No.: 10/831,869

(22) Filed: Apr. 26, 2004

(65) Prior Publication Data

US 2004/0249086 A1 Dec. 9, 2004

Related U.S. Application Data

(60) Provisional application No. 60/476,017, filed on Jun. 5, 2003.

(51) Int. Cl.$^7$ .................. C07C 31/18; C08F 138/00
(52) U.S. Cl. ............... 568/852; 568/857; 568/910.5; 526/285
(58) Field of Search .................. 568/852, 857, 568/910.5; 526/285

(56) References Cited

U.S. PATENT DOCUMENTS 4,917,784 A    4/1990   Shelnutt .................. 204/157.6

OTHER PUBLICATIONS

Ruthenium meso–tetrakis(2,6–dichlorophynyl)porphyrin Complex Immobilized in Mesoporous MCM–41 as a Heterogeneous Catalyst For Selective Alkene Epoxidations, Liu, Chun–Jing; Yu, Wing–Yiu; Li, Shou–Gul; Che, Chi–Ming; *J. Org. Chem.* 1998, 63, 7364–7369.
Radical Autoxidation and Autogenous O2 Evolution in Manganese–Porphyrin Catalyzed Alkane Oxidations with Chlorite, Slaughter, LeGrande M.; Collman, James P.; Eberspacher, Todd A.; Brauman, John I. *Inorganic Chemistry* 2004, 43(17), 5198–2004.
Oxidation of alkanes catalyzed by manganese(III) porphyrin in an ionic liquid at room temperature, li, Zhen; Xia, Chun–Gu; Xu, Chuan–Zhi, *Tetrahedron Letters* 2003, 44(51), 9229–9232.
Cationic manganese(III) porphyrins bound to a novel bis–functionalized silica as catalysts for hydrocarbons oxygenation by iodosylbenzene and hydrogen peroxide, Vinhado, F. S.; Prado–Manso, C. M. C.; Sacco, H. C.; Iamamoto, Y. *Journal of Molecular Catalysis A: Chemical* 2001, 174(1–2), 279–288.
Shape selectivity for alkane hydroxylation with a new class of Phosphonate–based heterogenised manganese porphyrins, Deniaud, David; Spyroulias, G. A.; Bartoli, Jean–Francois; Battioni, Pierrette; Mansuy, Daniel; Pinel, Catherine; Odobel, Fabrice; Bujoli, Bruno; *New J. Chem*, 1998, 901–905.

Electronic state and three–dimensional structure of Mn(III) active sites in manganese–containing aluminophosphate molecular sieve catalysts for the oxyfunctionalisation of alkanes, Cora, Furio; Sankar, Gopinathan; Catlow, C. Richard A.; Thomas, John M.; *The Royal Society of Chemistry* 2002, 734–735.
Oxidation of alkanes and alkenes by iodosylbenzene and hydrogen peroxide catalysed by halogenated manganese porphyrins in homogeneous solution and covalently bound to silica, Doro, Fabio G.; Smith, John R. Lindsay; Ferreira, Antonio G.; Assis, Marilda D.; *Journal of Molecular Catalysis A*; 2000, 164, 97–108.
Alkane Activation and Functionalization under Mild Conditions by a Homogeneous Manganese (III) Porphyrin–Iodosylbenzene Oxidizing System, Hill, C. L.; Schardt, B. C. *J. Am. Chem. Soc.* 1980, 102, 6374–5.
Hydrocarbon Oxidations with Oxometalloporphinates, Isolation and Reactions of a (Porphinato) manganese (V) Complex, Groves, J. T.; Kruper, W. J.; Haushalter, R. C. 1980, 102, 6375–77.
Oxone as Oxygen Donor in the Catalytic Hydroxylation of Saturate Hydrocarbons, de Poorter, B.; Ricci, M.; Meunier, B. *Tet. Lett.* 1985, 26, 4459–62.
Oxygenation of Hydrocarbons by KHSO$_5$ Catalyzed by Manganese Porphyrin Complexes, Robert, A.; Meunier, B. *New J. Chem.* 1988, 12, 885.
Intramolecular Kinetic Isotope Effects in Alkane Hydroxylations Catalyzed by Manganese and Iron Porphyrin Complexes, Sorokin, A.; Robert, A.; Meunier, B. *J. Am. Chem. Soc.* 1993, 115, 7293–99.
Preparation and catalytic activities of the manganese and iron derivatives of Br$_8$TMP and Cl$_{12}$TMP, two robust porphyrin ligands obtained by halogenation of tetramesitylporphyrin, Hoffman, P.; Robert, A.; Meunier, B. *Bull. Soc. Chim. Fr.*1992, 129, 85.
Hydroxylation of Saturated Hydrocarbons by Magnesium Monoperoxyphthalate Catalysed by Manganese Porphyrins, Querci, C.; Ricci, M. *Tet. Lett.* 1990, 31, 1779–82.
Oxidation of Cycloalkanes and Arylalkanes with Sodium Periodate Catalysed by Manganese Porphyrins, Mohajer, D.; Tayebee, R.; Goudarziafshar, H. *J. Chem. Res. (S)* 1998, 822–3.
Catalytic Oxidation of Saturated C–H Bonds by etrabutylammonium Periodate and Manganese Porphyrins, Mohajer, D.; Begherzadeh, M. *J. Chem. Res. (S)* 1998, 556–7.

(Continued)

*Primary Examiner*—Samuel Barts
*Assistant Examiner*—Sikarl A. Witherspoon
(74) *Attorney, Agent, or Firm*—Susan Moeller Zerull

(57) ABSTRACT

The present invention is a method for oxyfunctionalizing, that is, introducing oxygen functionality to, a polyolefin such as polypropylene and poly(ethylene-alt-propylene). The polyolefin is contacted with an oxygen source such as a persulfate and catalytic amounts of a metal porphyrin complex under mild conditions to yield an oxyfunctionalized polymer that has a polydispersity that is very similar to that of the starting polymer.

17 Claims, No Drawings

OTHER PUBLICATIONS

Metalloporphyrins as Versatile Catalysts for Oxidation Reactions and Oxidative DNA Cleavage, Meunier, B. *Chem. Rev.*1992, 92, 1411–56.

Monooxygenase–like Oxidation of Hydrocarbons by $H_2O_2$ Catalyzed by Manganese Porphyrins and Imidazole: Selection of the Best Catalytic System and Nature of the Active Oxygen Species, Battioni, P.; Renaud, J. P.; Bartoli, J. F.; Reina–Artiles, M.; Fort, M.; Mansuy, D. *J. Am. Chem. Soc.* 1988, 110, 8462–70.

Epoxidation and Hydroxylation Reactions Catalyzed by the Manganese and Iron Complexes of 5, 10, 15,20–tetrakis(2, 6–dimethoxyphenyl)porphyrin, Baciocchi, E.; Boschi, T.; Galli, C.; Lapi, A.; Tagliatesta, P. *Tetrahedron* 1997, 53, 4497–4502.

Isolierung and Charakterisierung eines Mangan(IV)–Pentafluoriodosylbenzol–Porphinato–Komplexes als Modell der aktiven Spezies im Katalysecyclus von Cytochrom–P–450, Heinrich, V.; Mueller, W. *Liebigs. Ann. Chem.* 1992, 11, 1097–101. (C6F5IO).

Hydroxylation of Alkanes by Hydrogen Peroxide: an Efficient System using Manganese Porphyrins and Imidazole as Catalysts, Battioni, P.; Renaud, J. P.; Bartoli, J. F.; Mansuy, D. *J. J. Chem. Soc., Chem. Comm.* 1986, 341–3.

Metalloporphyrin–catalyzed oxidation of some hydrocarbons with hydrogen peroxide, Iwanejko, R.; Mlodnicka, T.; Poltowicz, J. *Bull. Pol. Acad. Sci., Chem.* 1996, (vol. date 1995), 43, 325–336.

Biomimetic catalysts for selective oxidation in organic chemistry, Mansuy, D. *Pure and Applied Chem.* 1990, 62, 741–6.

Monooxygenase–Like Oxidations of Olefins and Alkanes Catalyzed by Manganese Porphyrins : Comparison of Systems Involving Either $O_2$ and Ascorbate or Iodosylbenzene, Fontecave, M.; Mansuy, D. *Tetrahedron.* 1984, 40, 4297–4311.

A New and Efficient Biomimetic System for Hydrocarbon Oxidation by Dioxygen Using Manganese Porphyrins, Imidazole, and Zinc, Battioni, P.; Bartoli, J. F.; Leduc, P.; Fontecave, M.; Mansuy, D. *J. Chem. Soc., Chem. Comm.*, 1987, 791–2.

Battioni; P.; Iwanejko, R.; Mansuy, D.; Miodnicka,T. *in Studies of Surface Science and Catalysis: New Developments in Selective Oxidation II*. vol. 82, ed. Corberan, V.C., Bellon, S.V., New York, New York 1994, 82, 653–8.

Manganese porphyrins covalently bound to silica and montmorillonite K10 as efficient catalysts for alkene and alkane oxidation by hydrogen peroxide, Martinez–Lorente, M. A.; Battioni, J. F.; Kleemiss, W.; Bartoli, J. F.; Mansuy, D. *J. Mol. Cat. A*. 1996, 113, 343–53. (H2O2 supported), Perkins Trans 2, 2001, 2, 181. SiO2.

Highly Oxidation Resistant Inorganic–Porphyrin Analogue Polyoxometalate Oxidation Catalysts., Mansuy, D.; Bartoli, J. F.; Battioni, P.; Lyon, D. K.; Finke, R. G. *J. Am. Chem. Soc.* 1991, 113, 7222–6.

Rhodium–Ctalyzed, Regiospecific Functionalization of Polyolefins in the Melt, Kondo, Y.; Garcia–Cuadrado, D.; Hartwig, J.; Boaen, N.; Wagner, N.; and Hillmyer, M, *J. Am. Chem. Soc.*, JACS Communications 2002, vol. 124, No. 7, 1164–1165.

OXYFUNCTIONALIZATION OF POLYOLEFINS

CROSS-REFERENCE STATEMENT

This application claims the benefit of U.S. Provisional application No. 60/476,017 filed Jun. 5, 2003.

BACKGROUND OF THE INVENTION

Saturated polyolefins, such as polyethylene and polypropylene are inexpensive, commodity polymers that find a wide array of uses because of their toughness, ease of processability, and resistance to degradation. In spite of these attractive properties, the absence of polar functional groups such as hydroxyl or carbonyl groups renders them ill-suited for applications requiring miscibility with polar pigments, adhesion, or barrier properties. Although polar functionality can be introduced into the backbone of these polymers, for example, by grafting of an anhydride such as maleic anhydride followed by imidization with a diamine or an alcohol amine, such methods tend to promote polymer cleavage, which lowers the molecular weight and/or increases the polydispersity of the polymer, thereby resulting in a polymer with poorer physical properties. It would, therefore, be desirable to provide a simple way of introducing polar functionality onto the backbone of polyolefins without substantially changing either the number average molecular weight or the polydispersity of the product with respect to the starting material.

SUMMARY OF THE INVENTION

The present invention addresses a deficiency in the art by providing a method of oxyfunctionalizing a polyolefin comprising the steps of contacting a) a polyolefin having a number average molecular weight ($M_n$) of at least 2000 Daltons with b) an oxygen source and c) a catalytic amount of a metal porphyrin complex, under such conditions to incorporate oxygen into the polyolefin.

In a second aspect, the present in invention is a method of oxyfunctionalizing a polyolefin comprising the steps of contacting a) a polyolefin having a number average molecular weight ($M_n$) of at least 2000 Daltons with b) a persulfate c) a nitrogen-containing base; and d) a catalytic amount of a metal porphyrin complex, under such conditions to incorporate oxygen into the polyolefin.

DETAILED DESCRIPTION OF THE INVENTION

The present invention is a method of oxyfunctionalizing a polyolefin comprising the step of reacting the polyolefin with an oxygen source and in the presence of a metal porphyrin complex under such conditions to oxyfunctionalize the polyolefin. As used herein, the term "oxyfunctionalize" is used to describe either the introduction of hydroxyl groups or carbonyl groups or both into the polyolefin. A preferred oxyfunctionalization includes the addition of hydroxyl groups into the polyolefin.

The polyolefin that is to be oxyfunctionalized may be any hydrocarbon having a number average molecular weight ($M_n$) of at least 2000 Daltons, more preferably at least 4000 Daltons, and most preferably greater than 40,000 Daltons. The polymer may also include other functionality in addition to hydrogen and carbon groups and may be completely saturated or contain some degree of unsaturation. Examples of polyolefin starting materials include polyethylene, random ethylene-α-olefin copolymers such as ethylene-1-octene and ethylene-1-octene copolymers, polypropylene, and hydrogenated polyisoprene (also known as poly(ethylene-alt-propylene)). Because it is believed that the presence of tertiary carbon centers (methine groups) in the starting polymer facilitate the creation of hydroxyl groups in the oxyfunctionalization reaction of the present invention, polyolefins such as polypropylene and poly(ethylene-alt-propylene) are preferred where hydroxylation is a preferred reaction. In contrast, the presence of secondary carbon centers (methylene groups) are believed to promote the complete oxidation of the center to carbonyl groups.

The metal porphyrin complex used in the oxyfunctionalization has the following structure:

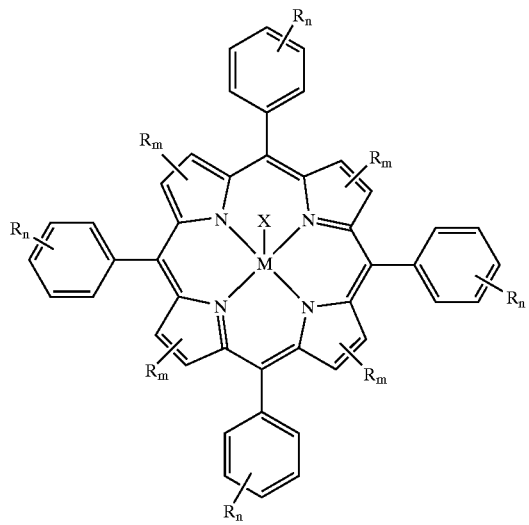

where each R is independently alkyl, nitro, or halo, preferably methyl, Cl, or Br; n is an integer in the range of 0 to 5, m an integer in the range of 0 to 2; M is a metal, preferably manganese or iron, more preferably manganese; and X is a halide or acetate (OAc).

A preferred metal porphyrin complex is a manganese porphyrin complex, more preferably a halogenated manganese porphyrin complex. An example of an especially preferred halogenated manganese porphyrin complex is meso-tetra-2,6-dichlorophenylporphyrin acetate, which is known in the art and illustrated below:

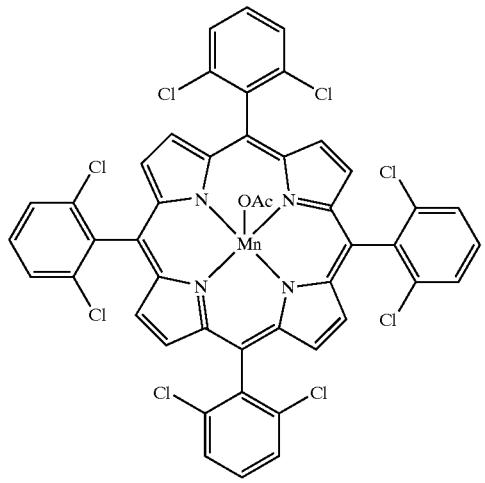

The polyolefin is reacted in the presence of the metal porphyrin complex, an oxygen source, and preferably a nitrogen-containing base. The oxygen source is preferably a peroxide such as a peroxymonosulfate; a hypohalite such as hypochlorites and hypobromites; and perhaloates such as perchlorates, perbromates, and periodates. A more preferred oxygen source is a peroxymonosulfate such as an alkali metal peroxymonosulfate. An example of a commercially available alkali metal peroxymonosulfate is potassium peroxymonosulfate, commerically availabe as Oxone® oxidant ($2KHSO_5 \cdot KHSO_4 \cdot K_2SO_4$, a registered trademark of E. I. du Pont De Nemours). The oxygen source is advantageously used in stoichiometric excess with respect to the metal porphyrin complex. Preferably the mole-to-mole ratio of oxygen source to the metal porphyrin complex is from about 100:1 to 500:1.

Similarly, the mole-to-mole ratio of a polyolefin repeat unit to the metal porphyrin complex is preferably from about a 100:1 to about 500:1. As used herein, the term "polyolefin repeat unit" is used to refer to the monomer repeat unit of the polymer. For example, a monomer repeat unit of poly(ethylene-alt-propylene) has the following structure:

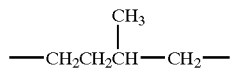

The nitrogen-containing base is advantageously used to promote the oxidation of the polymer. Examples of nitrogen-containing bases include pyridines such as 4-t-butylpyridine and substituted and unsubstituted imidazoles. Preferably, the nitrogen-containing base is used in a stoichiometric excess with respect to the metal porphyrin complex, more preferably at a mole-to-mole ratio of from about 5:1 to about 20:1.

When a water-soluble oxygen source such as an alkali metal persulfate is used, then it is desirable to use a phase transfer reagent, which is preferably a surfactant that is not easily oxidized. An example of a preferred phase transfer reagent is benzyldimethyltetradecylammonium chloride (BDTAC). When a phase transfer reagent is used, it is preferably used at a mole-to-mole ratio of from about 10:1 to about 100:1 with respect to the metal porphyrin complex.

It has been surprisingly discovered that oxygen functionality in the form of hydroxyl groups or carbonyl groups or both can be introduced into a polyolefin without substantially affecting the polydispersity of the polymer. Preferably, the polydispersity (the weight average molecular weight, $M_W$, divided by the number average molecular weight, $M_n$) of the oxyfunctionalized polymer is not more than 50%, more preferably not more than 20%, and most preferably not more than 10% higher than the polydispersity of the starting polymer.

The following examples are for illustrative purposes only and are not intended to limit the scope of the invention.

EXAMPLE 1

Oxyfunctionalization of a Low Molecular Weight Poly(ethylene-alt-propylene)

A. Starting Materials—Imidazole, benzyldimethyltetradecylammonium chloride (BDTAC), potassium hydrogen persulfate (Oxone® oxidant), and sec-butyl lithium were obtained from Aldrich. Pyrrole was distilled before use. A cyclohexane solution of the polymer substrate was purified by stirring over $H_2SO_4$, followed by the neutralization of the organic layer by washing with a saturated solution of $Na_2CO_3$. The organic layer was dried over $MgSO_4$ and passed through a column of neutral alumina. The filtrate was concentrated using rotary evaporation.

B. Synthesis of Poly(ethylene-alt-propylene) (PEP)—In a first step, polyisoprene is synthesized via anionic polymerization of isoprene. Catalytic hydrogenation of polyisoprene provides poly(ethylene-alt-propylene). Isoprene was purified by freeze-thaw degassing then further purified over n-butyl lithium and placed in a buret. Purified cyclohexane (1 L) was added to a dried reactor under argon with stirring and maintained at 40° C. An initiator, sec-butyl lithium, was added via syringe as a 1.46 M solution in cyclohexane (13.75 mL, 0.02 mol sec-butyl lithium). The isoprene buret (91.24 g, 1.34 mol) was then opened to the reactor and the reaction was stirred at 40° C. for 5 h, after which time the reaction was quenched by the addition of an excess of degassed methanol (8 mL, 0.20 mol). The cyclohexane solution of the polymer was concentrated, and purified through a short column of alumina. A small quantity of the polymer solution was concentrated and dried for molecular characterization of the product. The purified cyclohexane solution was concentrated and transferred to a 1-L stainless steel reactor along with Dow Hydrogenation Catalyst (Pt/$SiO_2$) (10:1 mass ratio of polymer to catalyst). The reactor was closed, heated, degassed, and maintained under nitrogen with stirring at 50° C. The reactor was pressurized to 500 psi $H_2$ and the temperature was increased to 80° C. As the pressure in the reactor dropped, $H_2$ was added periodically. The reaction was allowed to proceed overnight. The reactor was cooled, the solution was filtered to remove the catalyst and then precipitated in a 50/50 mixture of ice-cold methanol and isopropanol. The solvent was then carefully decanted and the viscous, semitransparent liquid polymer was dried in vacuo at 80° C. for approximately 36 hours. The number-average molecular weight, $M_n$, of the polyisoprene precursor was calculated by end-group analysis using $^1H$ NMR to be 4800 g/mol. Analysis by size exclusion chromatography (SEC) provided $M_n$ of 6000 g/mol relative to polystyrene standards, and a molecular weight distribution, or polydispersity index (PDI), of 1.03. After hydrogenation, SEC analysis of the hydrogenated product, low-molecular-weight PEP, showed the parameters of the model starting material were retained: $M_n$ for the low molecular weight PEP, 8310 g/mol, relative to polystyrene standards, and a PDI of 1.07.

C. Synthesis of Manganese meso-(tetra-2,6-dichlorophenylporphyrin) Acetate—[Mn(TDCPP)OAc]. Mn(TDCPP)OAc was prepared in 2 steps. First, the free base porphyrin, tetra-2,6-dichlorophenylporphyrin ($H_2$TDCPP) was synthesized following a modified Lindsey procedure. Freshly distilled pyrrole (2.17 mL, 31.3 mmol) and 2,6-dichorobenzaldehyde (5.54 g, 31.3 mmol) were dissolved in 1.8 L of $CH_2Cl_2$ in a 2-L, 3-necked flask. $BF_3 \cdot OEt_2$ (1.17 mL, 9.2 mmol) was added with stirring. The reaction was stirred at room temperature for 2 h under $N_2$, after which, the solution was brought slowly to a gentle reflux, and 2,3-dichloro-5,6-dicyano-1,4-benzoquinone (5.44 g, 23.5 mmol) was added as a powder. The reaction was stirred under reflux for 30 minutes. The reaction mixture was cooled, concentrated, and the product was washed with methanol until the filtrate was clear to remove impurities. The product was further purified by column chromatography (neutral alumina, $CH_2Cl_2$). (1.71 g, 25% yield).

In a second step, the metallation reaction, a 1-L, 3-necked flask equipped with a reflux condenser, a thermometer, and a magnetic stir bar, was charged with 500 mL N,N-dimethylformamide (DMF), $H_2$TDCPP (0.56 g, 0.62 mmol), and 2,4,6-collidine (10 mL, 75.6 mmol). The reaction was heated to reflux under $N_2$, and manganese acetate tetrahydrate (50g, 289 mmol) was added. The reaction was stirred under reflux for 21 h, and the metallation reaction was monitored by UV/visible spectroscopy (shift in the Soret band from 418 to 478 nm). The reaction mixture was cooled, and the product was precipitated in brine (0° C.), collected by vacuum filtration and washed with cold distilled water. The product, Mn(TDCPP)OAc was purified by Soxhlet extraction with hexanes, followed by extraction with methylene chloride, and subsequent column chromatography (neutral alumina, 100% $CH_2Cl_2$ to elute unreacted porphyrin, followed by 100% methanol to elute the catalyst). (0.34 g, 54% yield). Characterization of the product using $^1H$ NMR and UV-vis spectroscopy, as well as fast atom bombardment mass spectrometric (FAB-MS) analysis was consistent with that reported in the literature.

D. Oxyfunctionalization of a Low-Molecular-Weight Model Polyolefin (5 kg/mol), poly(ethylene-alt-propylene) (PEP)—A high pressure reactor was charged with Mn(TDCPP)OAc (18.1 mg, 18.1 μmol), imidazole (12.3 mg, 0.18 mmol), BDTAC (0.2894 g, 0.72 mmol), the low molecular weight PEP (0.5058 g, 7.2 mmol monomer), $CH_2Cl_2$ (10 mL), and Oxone® oxidant (3.23 g, 5.25 mmol, added as a solution in 100 ML 0.25 M phosphate buffer, pH 7). The flask was sealed and the biphasic reaction mixture was stirred vigorously for 43 h at 50° C. The reaction was cooled and worked up in separatory funnel. The lower methylene chloride layer of the reaction was collected and washed with distilled water before drying over magnesium sulfate. The mixture was filtered, and solvent was removed in vacuo. The BDTAC and Mn(TDCPP)OAc were removed and a mixture of products was isolated. Mass yield: 0.2984 g, 45%. (Functionalized PEP 0.2897 g; Unreacted PEP recovered, 0.0087 g, 12% of original PEP, 88% conversion).

Spectroscopic characterization of the functionalized PEP by IR, carbon NMR, and proton NMR spectroscopy revealed that oxyfunctionalization occurred. A chemical shift in the proton NMR spectrum near 2.6 ppm suggests the presence of protons attached to a carbon α to a carbonyl group. The carbon NMR spectrum showed a resonance at 73 ppm, which is consistent with introduction of tertiary hydroxyl functionality. An increase in the glass-transition temperature was observed for the functionalized materials relative to the model parent polyolefin from −63° C. to −49° C. as measured using differential scanning calorimetry.

To determine the degree of hydroxylation, the functionalized PEP was acetylated with an excess of acetyl chloride. This acetylated product was analyzed quantitatively by proton NMR spectroscopy to reveal about 5 OH groups per polymer chain, or about 2 OH groups per 100 backbone carbon atoms. Size exclusion chromatography (SEC) of the functionalized PEP provided a number average molecular weight, $M_n$, of 6900 g/mol and a weight average molecular weight ($M_w$) of 8200 relative to polystyrene standards, and, therefore, a PDI of 1.2. The percent difference is determined by the difference of the PDI of the starting polyolefin ($PDI_0$) and the oxyfunctionalized polyolefin ($PDI_f$) divided by the PDI of the starting polyolefin all multiplied by 100.

$$((PDI_f-PDI_0)/PDI_0)\times 100$$

Thus, the PDI of the product is about 12% higher than the PDI of the starting polyolefin.

EXAMPLE 2

Oxyfunctionalization of a High Molecular Weight Poly(ethylene-alt-propylene)

The high-molecular-weight model PEP polymer was prepared using the procedure described above by changing the reaction stoichiometry. SEC equipped with a light-scattering detector provided an exact value for $M_n$=49.6 kg/mol and a PDI of 1.01 for the polyisoprene precursor. The $M_n$ was found to be 55.2 kg/mol relative to polystyrene standards and a PDI of 1.06. SEC of the hydrogenated high-molecular weight model material, PEP, provided an apparent molecular weight of 61.4 kg/mol and a PDI of 1.07.

The oxyfunctionalization of the high-molecular-weight PEP was performed essentially as described in Example 1 except that chloroform was used as a solvent in place of methylene chloride and the reaction mixture was stirred at room temperature for three days. In this example, the following materials and quantities were used: Mn(TDCPP)OAc (19.5 mg, 19.0 μmol), imidazole (12.4 mg, 0.18 mmol), BDTAC (0.2814 g, 0.70 mmol), high molecular weight PEP (0.4998 g, 7.14 mmol monomer), and 10 mL $CHCl_3$. Oxone® oxidant (1.1026 g, 1.79 mmol) was added to the reaction mixture as a solution in 36 mL 0.25 M phosphate buffer, pH=7. Mass yield: 0.2926 g, 27%. (Functionalized PEP 0.2903 g; Unreacted PEP recovered, 0.0023 g, <1% of original PEP, >99% conversion).

Neither proton NMR or IR. supported the introduction of ketone functional groups. In this example, acetylation and spectroscopic analysis as described above showed that about 12 OH groups were introduced into each polymer chain, or about 0.4 OH groups/100 backbone carbons. SEC analysis of the functionalized high molecular weight PEP provided a $M_n$, of 63.7 kg/mol relative to polystyrene standards and a $M_w$ of 72.2 kg/mol, corresponding to a PDI of 1.1. Thus, the PDI of the product is about 4% higher than the PDI of the starting polyolefin.

What is claimed is:

1. A method of oxyfunctionalizing a polyolefin comprising the steps of contacting a) a polyolefin having a number average molecular weight ($M_n$) of at least 2000 Daltons with b) an oxygen source and c) a catalytic amount of a metal porphyrin complex, under such conditions to incorporate oxygen into the polyolefin wherein the polydispersity index of the oxyfunctionalized polymer is not substantially increased over the polydispersity index of the polyolefin prior to oxyfunctionalization.

2. The method of claim 1 wherein the polyolefin has an $M_n$ of at least 4000 Daltons.

3. The method of claim 2 wherein the polydispersity index of the oxyfunctionalized polymer is not more than 50% greater than the polydispersity index of the polyolefin prior to oxyfunctionalization.

4. The method of claim 2 wherein the polydispersity index of the oxyfunctionalized polymer is not more than 20% greater than the polydispersity index of the polyolefin prior to oxyfunctionalization.

5. The method of claim 2 wherein the polydispersity index of the oxyfunctionalized polymer is not more than 10% greater than the polydispersity index of the polyolefin prior to oxyfunctionalization.

6. The method of claim 4 wherein the polymer contains methine groups.

7. The method of claim 6 wherein the polyolefin is a poly(ethylene-alt-propylene).

8. The method of claim 5 wherein the polyolefin is a poly(ethylene-alt-propylene) having a $M_n$ of at least 40,000 Daltons and the metal porphyrin complex is a manganese or an iron porphyrin complex.

9. The method of claim 6 wherein the polyolefin is a polypropylene or a random ethylene-α-olefin copolymer.

10. The method of claim 1 wherein the polyolefin is a polyethylene.

11. A method of oxyfunctionalizing a polyolefin comprising the steps of contacting a) a polyolefin having a number average molecular weight ($M_n$) of at least 2000 Daltons with b) a persulfate c) a nitrogen-containing base; and d) a catalytic amount of a metal porphyrin complex, under such conditions to incorporate oxygen into the polyolefin wherein the polydispersity index of the oxyfunctionalized polymer is not substantially increased over the polydispersity index of the polyolefin prior to oxyfunctionalization.

12. The method of claim 11 wherein the polyolefin is a poly(ethylene-alt-propylene) having a $M_n$ of at least 4000 Daltons and the metal porphyrin complex is a manganese or iron porphyrin complex.

13. The method of claim 12 wherein the nitrogen-containing base comprises an imidazole or a pyridine and the metal porphyrin complex is a manganese porphyrin complex.

14. The method of claim 13 wherein the oxygen source is water soluble and a phase transfer agent is included in the step to make the oxyfunctionalized polyolefin.

15. The method of claim 14 wherein the oxygen source comprises an alkali metal peroxymonosulfate, the phase tranfer agent comprises benzyldimethyltetradecylammonium chloride, and the manganese porphyrin complex is manganese meso-(tetra-2,6-dichlorophenylporphyrin) acetate.

16. A method of oxyfunctionalizing a polyolefin comprising the steps of contacting a) a polyolefin having a $M_n$ of at least 2000 Daltons with b) a persulfate; c) a nitrogen-containing base; d) a catalytic amount of a metal porphyrin complex, and e) a phase transfer agent under such conditions to incorporate oxygen into the polyolefin.

17. The method of claim 11 where the polydispersity index of the oxyfunctionalized polymer is not more than 50% greater than the polydispersity index of the polyolefin prior to oxyfunctionalization.

* * * * *